United States Patent
Stitt

(10) Patent No.: US 6,257,725 B1
(45) Date of Patent: *Jul. 10, 2001

(54) SHUTTER ASSEMBLY FOR A MOTION FILM PROJECTION

(75) Inventor: Robert I. Stitt, Morgan Hill, CA (US)

(73) Assignee: Advanced Image Systems, Inc., Los Altos, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/350,493

(22) Filed: Jul. 9, 1999

(51) Int. Cl.[7] .............................. G03B 1/56; G03B 1/00; G03B 9/08
(52) U.S. Cl. .................. 352/204; 352/159; 352/166; 352/184
(58) Field of Search .................. 352/159, 166–197, 352/204, 207; 198/618, 867.01, 867.15

(56) References Cited

U.S. PATENT DOCUMENTS

| | | | |
|---|---|---|---|
| 3,214,233 | * 10/1965 | Persidsky | 352/184 |
| 3,537,571 | * 11/1970 | Wiese | 198/867.01 |
| 3,848,731 | * 11/1974 | Wiese et al. | 198/618 |
| 4,113,366 | * 9/1978 | Glover | 352/18 |
| 4,114,996 | 9/1978 | Shaw | 352/184 |
| 4,365,877 | 12/1982 | Shaw | 352/184 |
| 4,441,796 | 4/1984 | Shaw | 352/184 |
| 4,516,675 | * 5/1985 | Koskovich | 198/803.1 |
| 4,534,630 | 8/1985 | Williamson | 352/194 |
| 4,835,555 | 5/1989 | Maxwell | 352/194 |
| 4,957,361 | 9/1990 | Shaw | 352/59 |
| 4,966,454 | 10/1990 | Toporkiewicz | 352/59 |
| 4,971,435 | 11/1990 | Shaw et al. | 352/59 |
| 4,993,828 | 2/1991 | Shaw et al. | 352/59 |
| 5,050,985 | 9/1991 | Shaw et al. | 352/184 |
| 5,085,612 | * 2/1992 | Muller et al. | 452/51 |
| 5,178,260 | * 1/1993 | Hochbein | 198/867.15 |
| 5,341,182 | 8/1994 | Schmidt | 352/184 |
| 5,587,750 | 12/1996 | Gibbon et al. | 352/184 |
| 5,782,337 | * 7/1998 | Langland | 198/803.1 |
| 5,806,953 | 9/1998 | Kucera et al. | 353/122 |

* cited by examiner

Primary Examiner—Russell Adams
Assistant Examiner—Rodney Fuller
(74) Attorney, Agent, or Firm—Carr & Ferrell LLP

(57) ABSTRACT

The invention is a mechanism for mounting a film shutter and assembly to a conveyor in a motion film projector, the film shutter assembly including a shutter secured to a mounting bracket, which houses a pair of trucks. Preferably, the mounting bracket securely houses a first truck and slidably houses a second truck to accommodate for the trucks passing over straight and curved portions of the truck, or shutter path. The trucks are rigidly clamped to the conveyor. This configuration permits the shutter to be stably coupled to the conveyor while permitting the shutter assembly to travel along both straight and curved paths. The trucks are generally configured to ride in a raceway, which supports the trucks and maintains the trucks on a predetermined truck path. In one embodiment, the trucks include rollers, which roll along an elongated channel formed in the raceway. According to another embodiment, the trucks include air bearings for carrying the truck along a pressurized raceway.

21 Claims, 9 Drawing Sheets

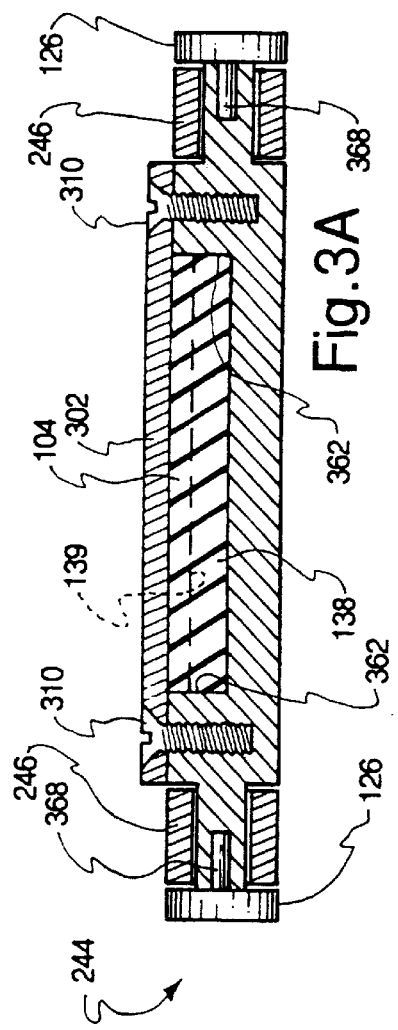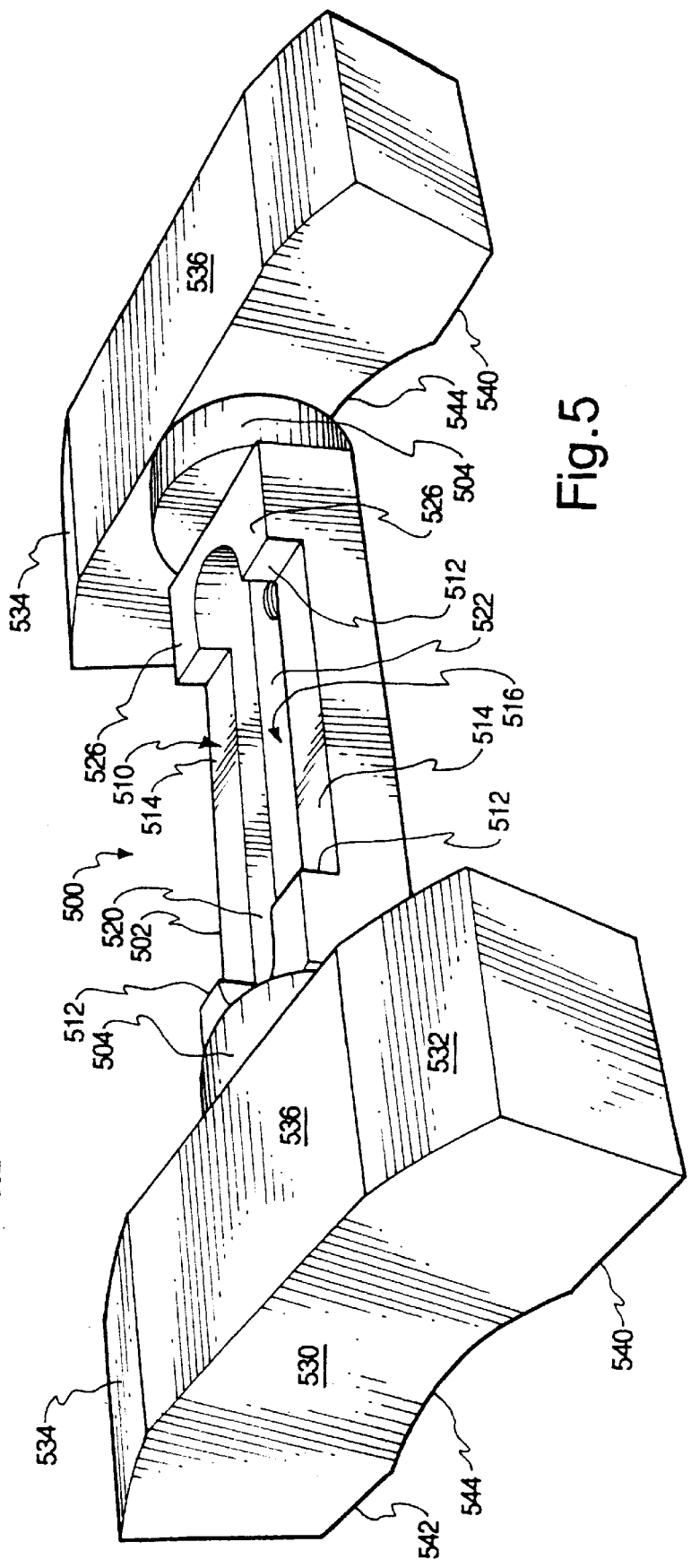

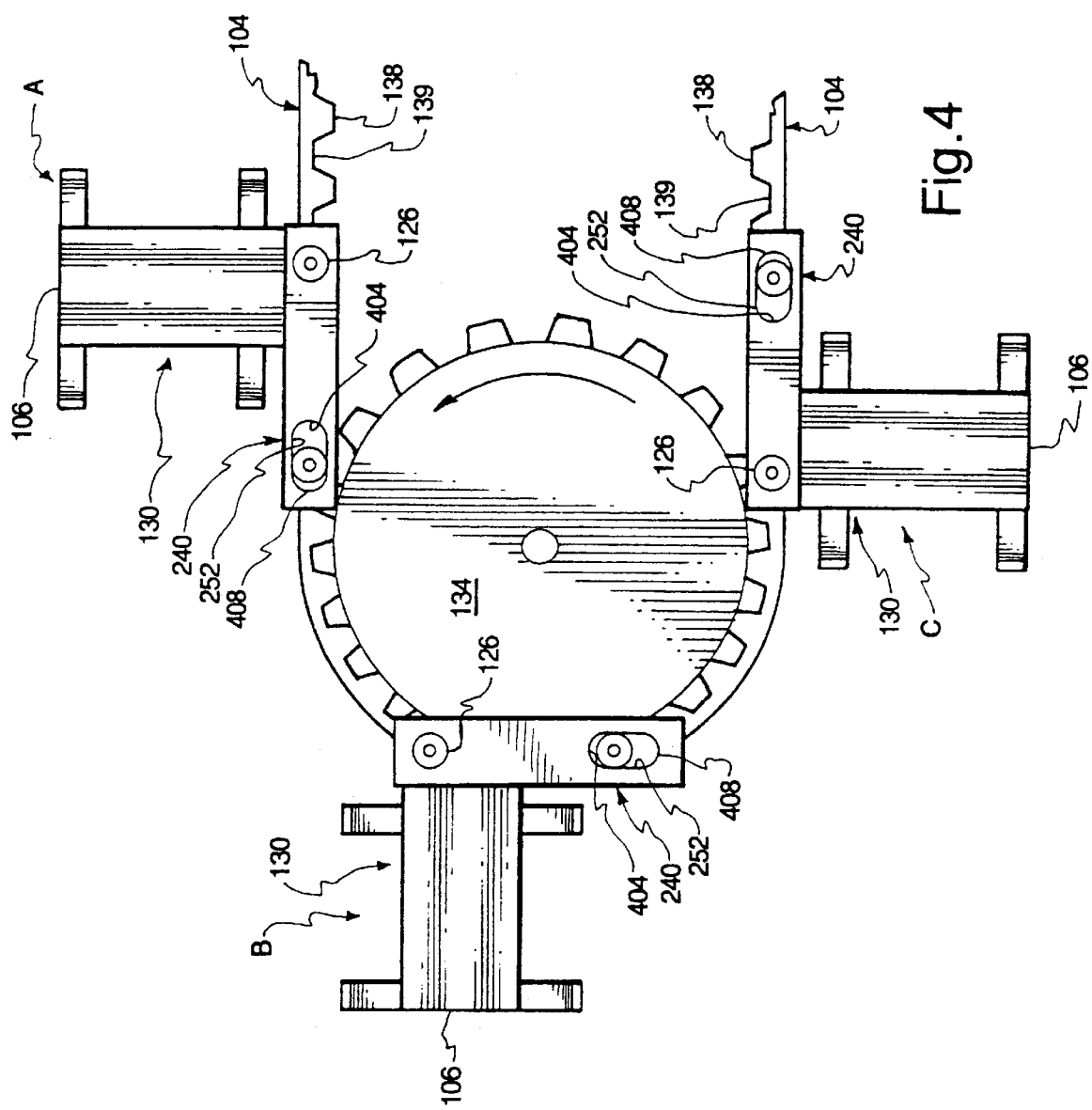

SHUTTER ASSEMBLY FOR A MOTION FILM PROJECTION

CROSS-REFERENCE TO RELATED APPLICATIONS

This is related to U.S. patent application Ser. No. 09/193,373, entitled System and Method for Transporting Film and Motion Film Projector Utilizing Same, filed Nov. 17, 1998, which is hereby incorporated by reference.

BACKGROUND OF THE INVENTION

1. Field of the Invention

The present invention relates generally to motion picture film projectors, and more particularly to a shutter assembly for carrying a film shutter into and out of alignment with a motion film projector aperture block.

2. Description of the Background Art

Motion picture film generally consists of a succession of still images or frames, which are sequentially projected onto a surface to produce the illusion of motion. Motion film projectors are, therefore, configured to transport each frame from a feed reel or spool to an aperture block, where the frame is held in stationary register for a period of time required for projection of the associated image. The frame is thereafter transported to a take-up. reel or spool. Similarly, a motion film camera is configured to transport each unexposed frame from a first location to the aperture block, where the frame is held in stationary register during exposure of the frame, and thereafter to a second location in the camera.

One motion film projector design is described in U.S. patent application Ser. No. 09/193,373, entitled System and Method for Transporting Film and Motion Film Projector Utilizing Same, filed Nov. 17, 1998. This design includes a plurality of shutters disposed on a moving linear conveyor for selectively shuttering a projector aperture block and for transporting the film across the aperture block. In one embodiment, the linear conveyor is a timing belt driven by toothed conveyor sprockets, which advance the shutters into and out of alignment with the aperture block at high speeds (48 shutters per second).

A need exists to provide a system and method by which a shutter may be reliably and securely mounted on a film projector conveyor such that the shutter is substantially stable. Moreover, a need exists to provide a shutter assembly that is adapted to carry a shutter over both straight and arcuate portions of a shutter travel path. An additional need exists for a shutter truck assembly that permits a shutter to be securely mounted on a toothed conveyor.

SUMMARY OF THE INVENTION

The present invention overcomes or substantially alleviates prior problems associated with motion film projectors and prior systems and methods for coupling a shutter to a conveyor. In general, the present invention provides a shutter assembly that includes a shutter disposed on a mounting bracket, which houses multiple trucks for guiding the shutter through a projector raceway. Preferably, the mounting bracket slidably houses one of the trucks to accommodate for the trucks passing over straight and curved portions of the truck path.

According to one embodiment, the shutter assembly includes a shutter securely mounted on a mounting bracket. The mounting bracket fixedly houses a first truck and slidably houses a second truck. The trucks are rigidly clamped to the conveyor. This configuration permits the shutter to be stably coupled to the conveyor while permitting the shutter assembly to travel along both straight and curved paths by permitting the second truck to slide relative to the mounting bracket as the mounting bracket passes between straight and curved paths.

The shutters are preferably of two general types: primary shutters and secondary shutters. The primary shutters are also referred to as film carriages, because they serve the dual functions of shuttering the film, and also transporting film loops into and out of alignment with a projector aperture block. The secondary shutters preferably include a flat, vertically-oriented, plate for supporting the film and for shuttering frames of the film.

The trucks are generally configured to ride in a raceway, which supports the trucks and maintains, or guides, the trucks along a predetermined truck path. In one embodiment, the trucks include rollers, which roll along an elongated channel formed in the raceway. According to another embodiment, the trucks include air bearings for carrying the truck along a pressurized air raceway.

Further, the trucks preferably include a groove that is sized to receive one of the teeth of the toothed conveyor. In this configuration, the truck may be secured to the toothed conveyor by positioning a conveyor tooth within the groove and then clamping the conveyor to the truck. Maintaining the conveyor tooth within the truck groove helps prevent the truck from moving relative to the belt.

In one embodiment, the shutter assembly path may be generally characterized as having top and bottom portions that are substantially straight, or linear, and side portions that are curved, or semicircular in shape. Because the shutter assembly passes along both straight and semicircular paths, the distance between the trucks rigidly mounted to the belt varies as the shutter assembly passes from a straight portion to a semicircular portion and vice versa. To accommodate for this variance in truck separation distance, the mounting bracket slidably houses one of the trucks so that the slidably housed truck may move relative to the other truck as the shutter assembly moves between straight and semicircular portions.

Additional advantages and features of the invention will be apparent from the drawings and detailed description as set forth below.

BRIEF DESCRIPTION OF THE DRAWINGS

FIG. 3A is a cross-sectional view of the truck of FIG. 3 as assembled;

FIG. 4 is a rear elevation view of a shutter assembly in different positions about a shutter assembly path;

FIG. 5 is a perspective view of another embodiment of a truck according to the present invention;

DETAILED DESCRIPTION OF THE PREFERRED EMBODIMENT

Figure 1:
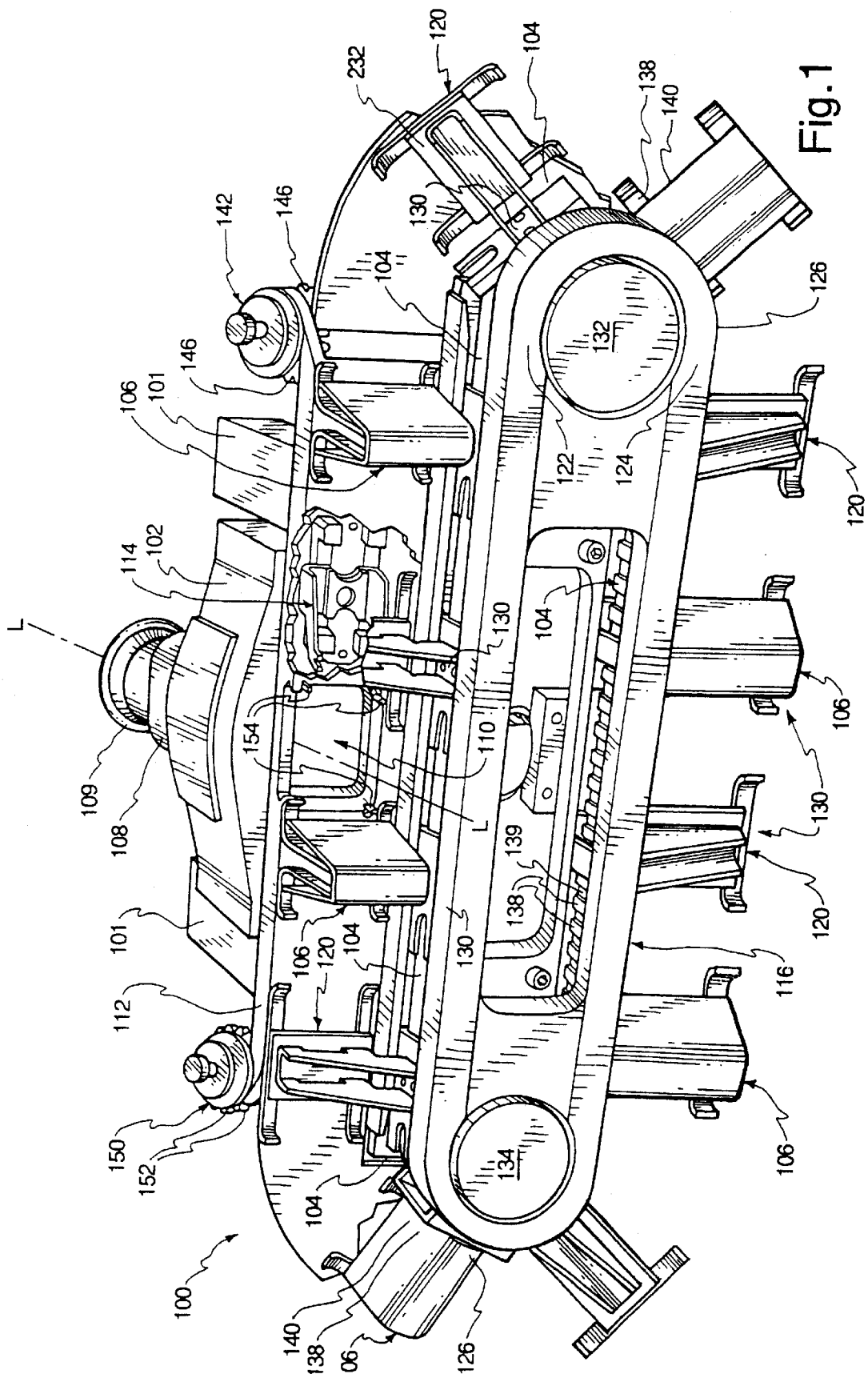
FIG. 1 is a perspective view of a projector according to the present invention.

FIG. 1 is a perspective view of the major components of a motion film projector 100 in accordance with the present invention. As shown, the projector 100 generally includes a base casting 101, a cam housing 102 adapted with an aperture block 110, a main lens 109, and a conveyor 104 for moving film through the projector. Multiple film carriages 106 mounted on the conveyor operate to receive and form loops of film and to transport sections of film into alignment with the aperture block 110. The aperture block 110, a lens holder 108, and the main lens 109 define an optical axis L along which the images on the film are projected. A deceleration mechanism 114 is mounted on the cam housing 102 to periodically engage and decelerate the film.

The conveyor 104 advances along a linear path by riding on a track 116. The track 116 and the conveyor 104 are illustrated as lying in a plane orthogonal to the optical axis L. In this configuration, the conveyor 104 linearly advances the film carriages 106 and secondary shutters 120 across the aperture block 110 and in a direction orthogonal to the optical axis L. The conveyor 104 advances along a semi-circular path between the top and bottom straight portions. In addition, a light source (not shown), such as a lamp, may be positioned behind the conveyor 104 to provide illumination to project images disposed on the film through the aperture block 110 and the main lens 109.

Figure 2:
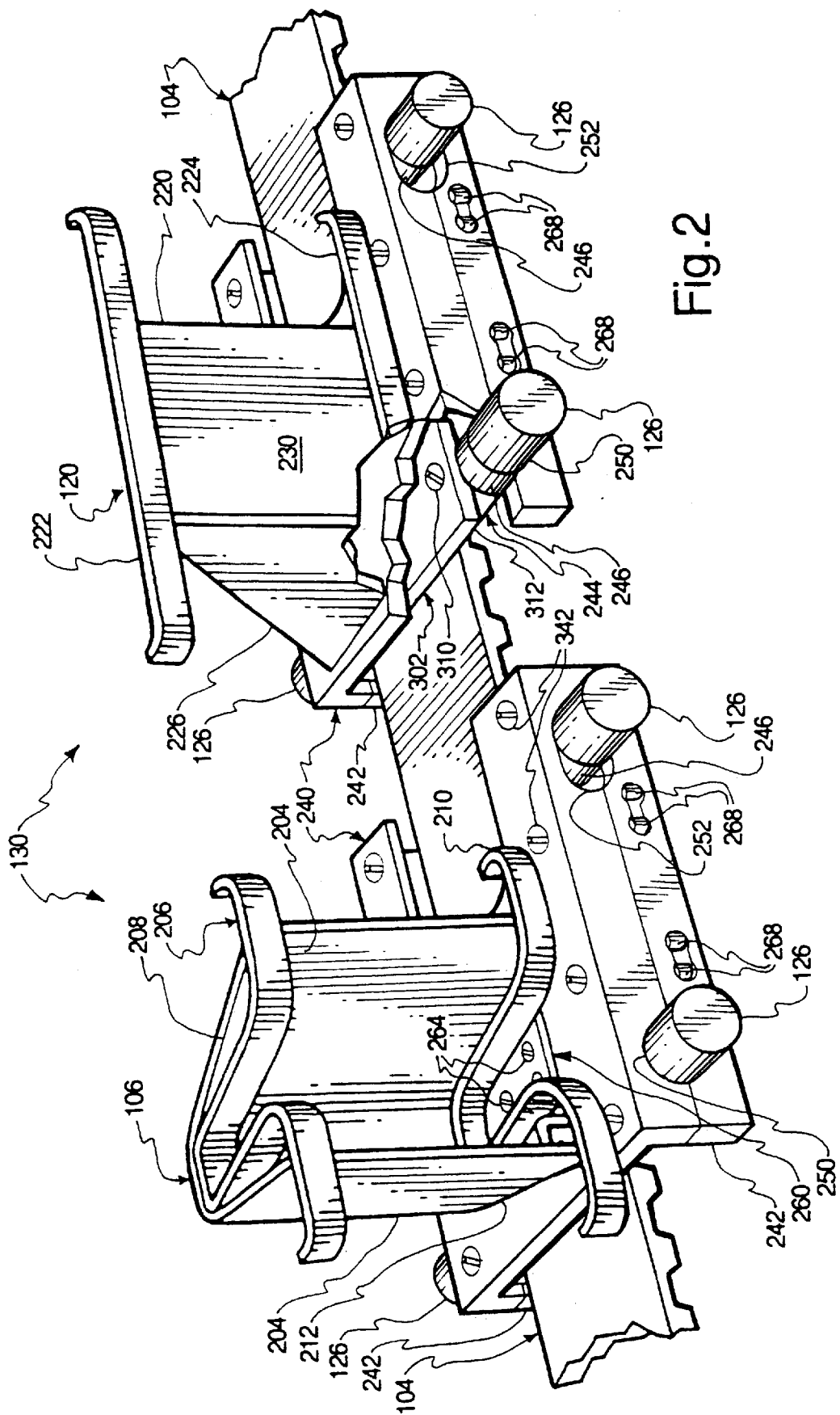
FIG. 2 is a perspective view of two shutter assemblies according to the present invention.

The track 116 includes upper and lower raceways 122 and 124 respectively to accommodate shutter assembly rollers 126 (FIG. 2). As shown, each film carriage 106 and each secondary shutter 120 comprises a portion of a shutter assembly 130 (FIG. 2). The shutter assemblies 130, in turn, are secured about the conveyor 104 in regularly spaced relation to one another.

Conveyor sprockets 132 and 134 are mounted on the base casting 101 and drive the conveyor 104 as the sprockets 132 and 134 rotate. As shown in FIG. 1, the sprockets 132 and 134 rotate in a counterclockwise direction to advance the film carriages 106 and the secondary shutters 120 from right to left across the aperture block 110 (as viewed from behind the plane of the projector). The conveyor 104 is preferably a timing belt having teeth 138 formed on a conveyor bottom surface 139. The conveyor teeth 138 engage, or mesh with, corresponding teeth 140 formed in the sprockets 132 and 134 to permit the conveyor 104 to advance in timed relation with the rotation of the sprockets 132 and 134.

As the sprockets 132 and 134 rotate, they drive the conveyor 104 linearly along the raceways 122 and 124 of the track 116. Specifically, the conveyor 104 advances the rollers 126 along the raceways 122 and 124 to advance the trucks 130 along the track 116. In turn, the trucks 130 advance the film carriages 106 and the secondary shutters 120 behind the aperture block 110 in a direction orthogonal to the optical axis L.

An input sprocket 142 driven to rotate at a substantially constant rotational velocity is mounted on the base casting 101 to continuously advance film at a desired film input speed along a film path toward the aperture block 110. In particular, the input sprocket 142 is shown as having teeth 146 formed thereon. The teeth 146 of the input sprocket 142 are sized and spaced about the input sprocket 142 to engage sprocket holes or perforations 402 (FIG. 5C) formed along top and bottom edges of the film. Thus, rotating the input sprocket 142 in a clockwise direction, as viewed from above, advances the film along the film path.

Likewise, the base casting 101 also has an output sprocket 150 driven at a constant rotational velocity mounted thereon to continuously advance the film along the film path away from the aperture block 110. In a manner similar to the input sprocket 142, the output sprocket 150 has teeth 152 that extend radially therefrom. The output sprocket teeth 152 engage top and bottom sets of apertures formed in the film. Accordingly, as the output sprocket 150 rotates in a clockwise direction, as viewed from above, the output sprocket 150 continuously withdraws film from the projector along the film path.

The film guide 112 is securely mounted on the base casting 101 and includes a set of apertures through which register pins 154 extend. The register pins 154 are secured on the cam housing 102 adjacent to the aperture block 110 to temporarily secure sections of film in register with the aperture block 110. The register pins 154 are adapted to engage top and bottom sets of apertures located at the upper and lower margins of the film. In this configuration, a section of film may be temporarily secured by the register pins 154 in alignment with the aperture block 110 for projection of an image disposed on the film.

FIG. 2 illustrates two shutter assemblies 130. As shown, a film carriage 106 and a secondary shutter 120 are mounted on a section of the conveyor 104. Specifically, the film carriage 106 includes a vertically-oriented U-shaped member 200 that has an exterior surface 202 and an inner surface 204. The film carriage 106 also includes a top film support 206 attached along the inner surface 204 and adjacent to a top edge 208. The top film support 206 supports the film in a substantially vertical orientation as the film passes through the projector 100 along the film path. Similarly, the film carriage 106 also includes a bottom film support 210 attached to the inner surface 204 and adjacent to a bottom edge 212. The film supports 206 and 210 are oriented horizontally and are substantially parallel to each other.

The secondary shutter 120 is shown as including a secondary shutter plate 220, top and bottom film supports 222 and 224, and a brace 226. The secondary shutter plate 220 is a vertically oriented planar member having a front surface 230 and a back surface 232 (FIG. 1). The brace 226 is secured to the secondary shutter plate back surface 232. The secondary shutter 120 shutters the aperture block 110 as it passes in front of the aperture block. The top and bottom film supports 222 and 224 are mounted on the secondary shutter plate front surface 230 adjacent to shutter plate top and bottom edges. In a manner similar to the film supports 206 and 210, the top and bottom film supports 222 and 224 support the film in a substantially vertical orientation as the film passes through the projector 100. Those skilled in the art will appreciate that the film carriages 106 and the secondary shutters 120 can be formed or machined.

Figure 3:
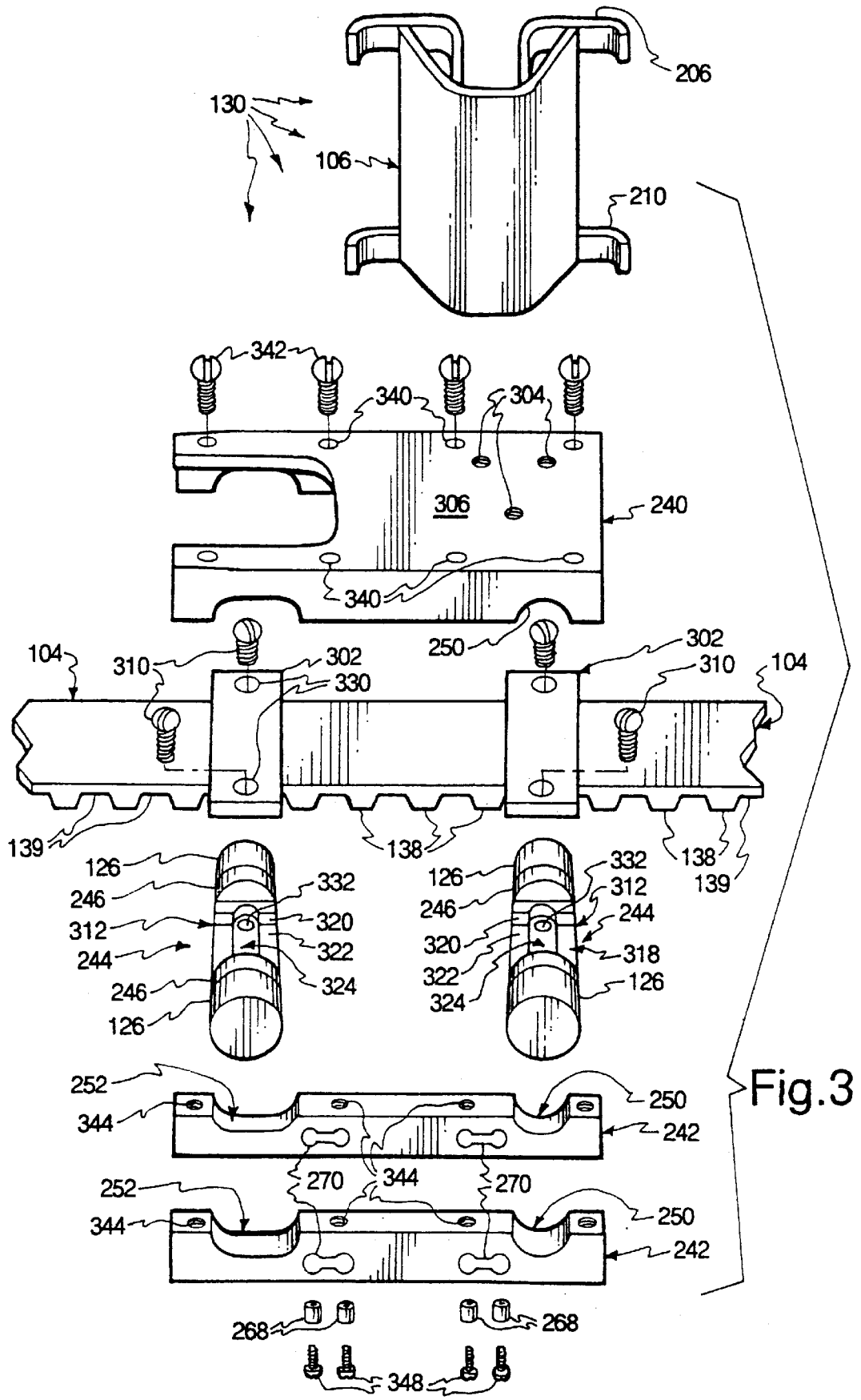
FIG. 3 is an exploded perspective view of one of the shutter assemblies of FIG. 2.

The film carriages 106 and the secondary shutters 120 are coupled to the conveyor 104 via mounting brackets 240. Each mounting bracket 240 includes a pair of elongated truck braces 242, which secure a pair of trucks 244 within the mounting bracket 240. In particular, when secured together in the configuration shown in FIG. 2, the mounting bracket 240 and the associated truck braces 242 define an aperture 250 and an elongated aperture, or slot, 252, through which the truck rollers 126 may extend. Hence, in this configuration, one truck 244 and pair of rollers 126 are statically positioned within the aperture 250 while another truck 244 and pair of rollers 126 are slidably disposed within the elongated aperture 252. To assist in positioning the truck bodies 244 within the apertures 250 and 252, each truck 244 also includes a pair of bushings 246 disposed between the rollers 126 and the truck body 312 (FIG. 3). In one embodiment, the bushings 246 comprise ball bearings.

In the embodiment shown in FIG. 2, the film carriage 106 includes a bottom plate 260 having apertures 262 formed therethrough for securing the film carriage 106 to the mounting bracket 240 via fasteners 264. Preferably, the film carriage 106 is centered over the aperture 250 of the mounting bracket 240 on which it is mounted. Likewise, the secondary shutter 120 is advantageously centered over the aperture 250 of the associated mounting bracket.

The truck braces 242 also have bearings 268 disposed therein to further assist the travel of the mounting bracket 240 through the raceways 122 and 124. As shown, the bearings 268 are positioned within bearing apertures 270 formed through the truck braces 242. The bearings 268 are configured to roll against a bottom vertical edge of the raceway 122 and the top vertical edge of the raceway 124.

FIG. 3 is an exploded perspective view of a shutter assembly 130 according to the present invention. As illustrated, the shutter assembly 130 includes a shutter (such as the primary shutter 106), a mounting bracket 240, clamps 302, trucks 244, and truck braces 242. The film carriage, or primary shutter, 106 is secured to the mounting bracket 240 by passing fasteners 264 (FIG. 2) through the apertures 262 bottom plate 260 (FIG. 2) and into threaded apertures 304 formed through a top surface 306 of the mounting bracket 240. As discussed above, the film carriage 106 is advantageously centered over the aperture 250 of the mounting bracket 240.

The trucks 244 are rigidly clamped to the belt 104 via the clamps 302 and fasteners 310. Each truck 244 is illustrated as including a pair of outside rollers 126, a truck body 312, and bushings 246 disposed between the truck body 312 and the outside rollers 126. The truck body 312 is an elongated member having a channel 318 defined by side edges 320 and a bottom surface 322. Moreover, each truck body 312 includes a groove 324. When assembled, a conveyor tooth 138 is inserted into the groove 324 and the conveyor bottom surface 139 located on either side of the inserted tooth 138 rests on the channel bottom surface 322. Preferably, the width of groove 324 is approximately equal to the width of the inserted tooth 138 so that the inserted tooth 138 fits tightly within the groove 324.

Once a tooth 138 is inserted into a truck groove 324 and the conveyor bottom surface 139 is laid against the channel bottom surface 322, the conveyor 104 may be clamped to the truck body 312 with one of the clamps 302. The conveyor 104 is positioned between the truck side edges 320. As shown, the clamps 302 each have a length approximately equal to the length of the truck bodies 244 and include apertures 330. Each truck body 244 also includes threaded apertures 332 for receiving the fasteners 310 as they pass though the clamp apertures 330. Preferably, the distance between the apertures 330 is greater than the width of the conveyor 104 so that the conveyor 104 may be clamped between the clamp 302 and the truck body 244 without having the fasteners 310 pass through the conveyor 104. Instead, the fasteners 310 pass through the apertures 330 into the threaded apertures 332 on either side of the conveyor 104.

After the conveyor 104 has been secured to two truck bodies 244 in the manner described above, the mounting bracket 240 secures the truck bodies 244 in the apertures 250 and 252 with the truck braces 242. As illustrated, the mounting bracket 240 has a row of apertures 340 positioned along front and back edges to receive fasteners 342. Likewise, each truck brace 242 also includes a corresponding row of threaded apertures 344 to receive the fasteners 342 to secure the truck brace 242 to the mounting bracket 240. In particular, the mounting bracket 240 is positioned over the clamps 302 such that the bushings 246 are disposed within the apertures 250 and 252.

Next, the truck braces 242 are secured within the mounting bracket 240 as shown in FIG. 2 by passing the fasteners 342 through the mounting bracket apertures 340 and into the truck brace threaded apertures 344. The bearings 268 are also mounted in the bearing apertures 270 with fasteners 348 as shown in FIG. 2. As discussed in more detail below, when assembled, the truck 244 secured in the aperture 250 does not move substantially relative to the mounting bracket 240, but is rather maintained in a fixed position with the bushing 246 positioned within the aperture 250, which has diameter only slightly larger than that of the bushing 246. In contrast, the truck 244 positioned in the elongated aperture 252 is slidably positioned within the mounting bracket 240 in that the truck 244 may slide laterally within the elongated aperture, or slot, 252.

FIG. 3A is a cross-sectional view of the truck 244 of FIG. 3 as assembled. As illustrated, a tooth 138 of the conveyor 104 is disposed within the truck groove 324. The truck groove 324 is sized to receive the tooth 138 and is defined by a bottom surface 360 and side walls 362. The conveyor 104 is further secured to the truck by the clamp 302, which is connected to the truck body 312 by the threaded fasteners 310. In one embodiment, the toothed conveyor 104 is formed of a resilient material, such as rubber, so that it may be, at least partially, compressed by being clamped between the clamp 302 and the truck body 312. In addition, as shown in FIG. 3A, the rollers 126 are press fit into the truck body 312 by shafts 368.

FIG. 4 is a rear elevation view of a shutter assembly 130, shown in three different positions A, B, and C as it is moved long a path of travel. As shown, when the shutter assembly 130 is in position A, the roller 126 and the bushing 246 (not shown) disposed in the elongated aperture 252 are spaced from an inside edge 404 of the elongated aperture 252. Then, as the shutter assembly 130 moves from position A to position B, the roller 126, as well as the associated truck 244 and bushings 246 (not shown), slides toward the inside edge 404 and away from an outside edge 408 of the elongated aperture 252.

Because the trucks 244 are rigidly affixed to the conveyor 104 by the clamps 302, as discussed above, the linear distance between the trucks 244 will change as the trucks 244 pass from a linear region, such as position A, to a nonlinear, or curved region, such as position B. Indeed, as the shutter assembly 130 moves from the position A to the position B, the distance between the trucks 244 decreases since the conveyor 104 must pass over the curved circumference of the sprocket 134. To accommodate for this change in distance between the trucks 244, the aperture 252 is elongated to permit the truck 244 disposed therein to slide relative to the mounting bracket 240.

Then, as the shutter assembly 130 moves from position B to position C, the distance between the trucks 244 and the associated rollers 126 increases and the roller 126 disposed within, or adjacent to, the elongated aperture 252 moves toward the outside edge 408 of the elongated aperture 252. As shown, the distance between the rollers 126 in position C is approximately the same as the distance between the rollers 126 in position A since they are both positioned in relatively straight portions of the shutter assembly path. Accordingly, in this manner, the shutter assembly may securely and reliably couple a shutter to a conveyor and permit the shutter assembly to pass through both straight and curved portions of the shutter assembly path.

FIG. 5 illustrates another embodiment of a truck according to the present invention. Specifically, FIG. 5 is a perspective view of a truck 500 that includes a truck body 502, a pair of bushings 504, and a pair of air bearings 506. As discussed in more detail below, the air bearings 506 are configured to pass through both straight and curved portions of a pressurized raceway.

The truck body 502 is configured in a manner identical to the truck body 312 and described above. That is, the truck body 502 is an elongated member having a channel 510 defined by side edges 512 and a bottom surface 514. Additionally, the truck body 502 includes a groove 516 defined by groove side walls 520 and a groove bottom surface 522. In this configuration, when a conveyor tooth 138 is inserted into the groove 516, the conveyor bottom surface 139 on either side of the inserted tooth 138 rests on the channel bottom surface 514 such that the conveyor top surface 105 is substantially flush with truck top surface 526. Positioning the belt top surface 105 flush with the truck top surface 526 permits one of the clamps 302 (FIG. 2) to be fastened to the truck body 502 adjacent to the truck body top surface 526. Additionally, the width of the groove 516, or the distance between groove sidewalls 520, is approximately equal to the width of the inserted tooth 138 so that the inserted tooth fits tightly within the groove 516.

Each air bearing 506 is configured to pass through both straight and curved, or semicircular, portions of a raceway as described in more detail below. As illustrated, each air bearing 506 extends from an adjacent bushing 504 and includes a transverse flat end surface 530. To accommodate for both curved and straight portions of a raceway, each air bearing 506 includes a top surface comprising a front curved surface 532, a rear curved surface 534, and a flat surface 536 interposed between the curved surfaces 532 and 534. Likewise, the air bearing 506 also includes a bottom surface adapted to conform to both curved, and semicircular, surfaces as well as to straight surfaces. In particular, the air bearing bottom surface comprises front and rear flat surfaces 540 and 542 and a curved surface 544 interposed between the front and rear flat surfaces 540 and 542.

Figure 6:
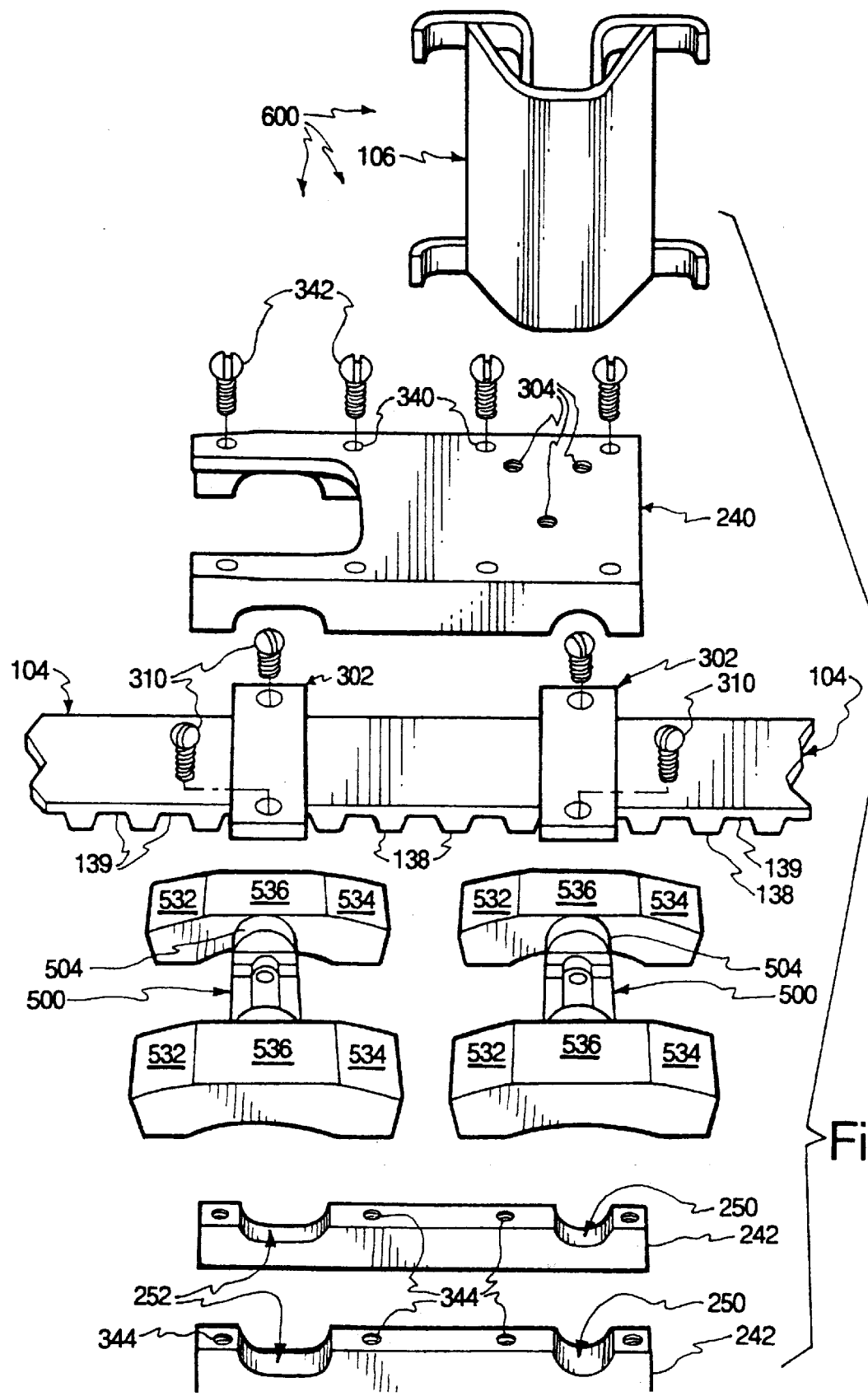
FIG. 6 is an exploded perspective view of a shutter assembly that includes the truck of FIG. 5.

FIG. 6 illustrates a shutter assembly 600, which is identical to the shutter assembly 130 of FIG. 3 with the exception that the truck 244 of FIG. 3 is replaced with the truck 500 of FIG. 5. The shutter assembly 600 is also assembled in the same manner as that described above with reference to FIG. 3. Accordingly, no further description is necessary.

Figure 7:
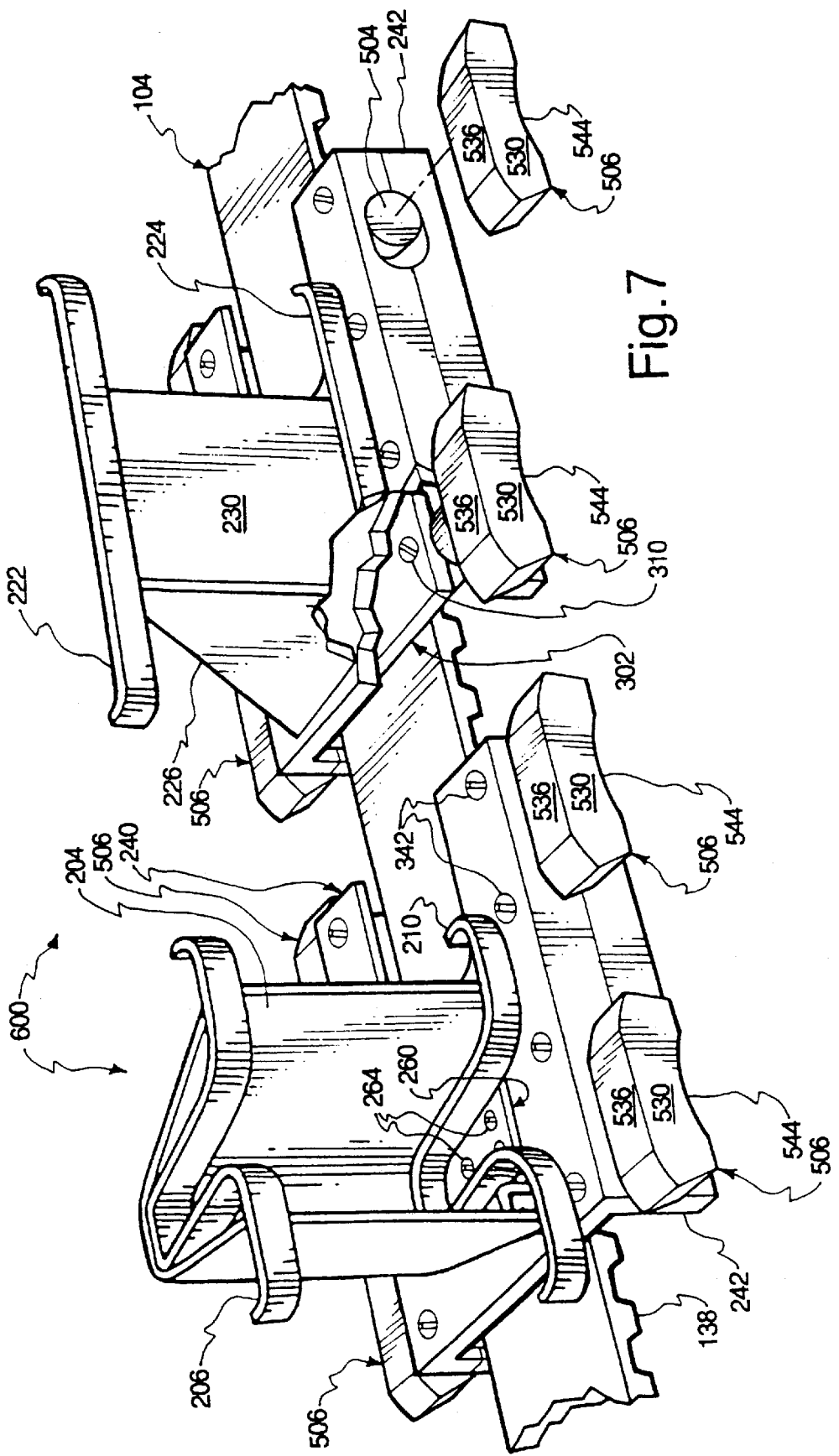
FIG. 7 is a perspective view of two shutter assemblies that include the truck of FIG. 5.

FIG. 7 is a perspective view of the shutter assembly 600 mounted on the conveyor 104 in accordance with the present invention. FIG. 7 depicts two shutter assemblies that include the truck 500 shown in FIG. 5. The shutter assemblies of FIG. 7 are identical to those shown in FIG. 2 and described above with the exception that they include air bearings 506 instead of rollers 126. Hence, no further description of the shutter assemblies 600 is necessary. As discussed in more detail below, the air bearings 506 are configured to ride in a pressurized raceway to guide the conveyor 104.

Figure 8:
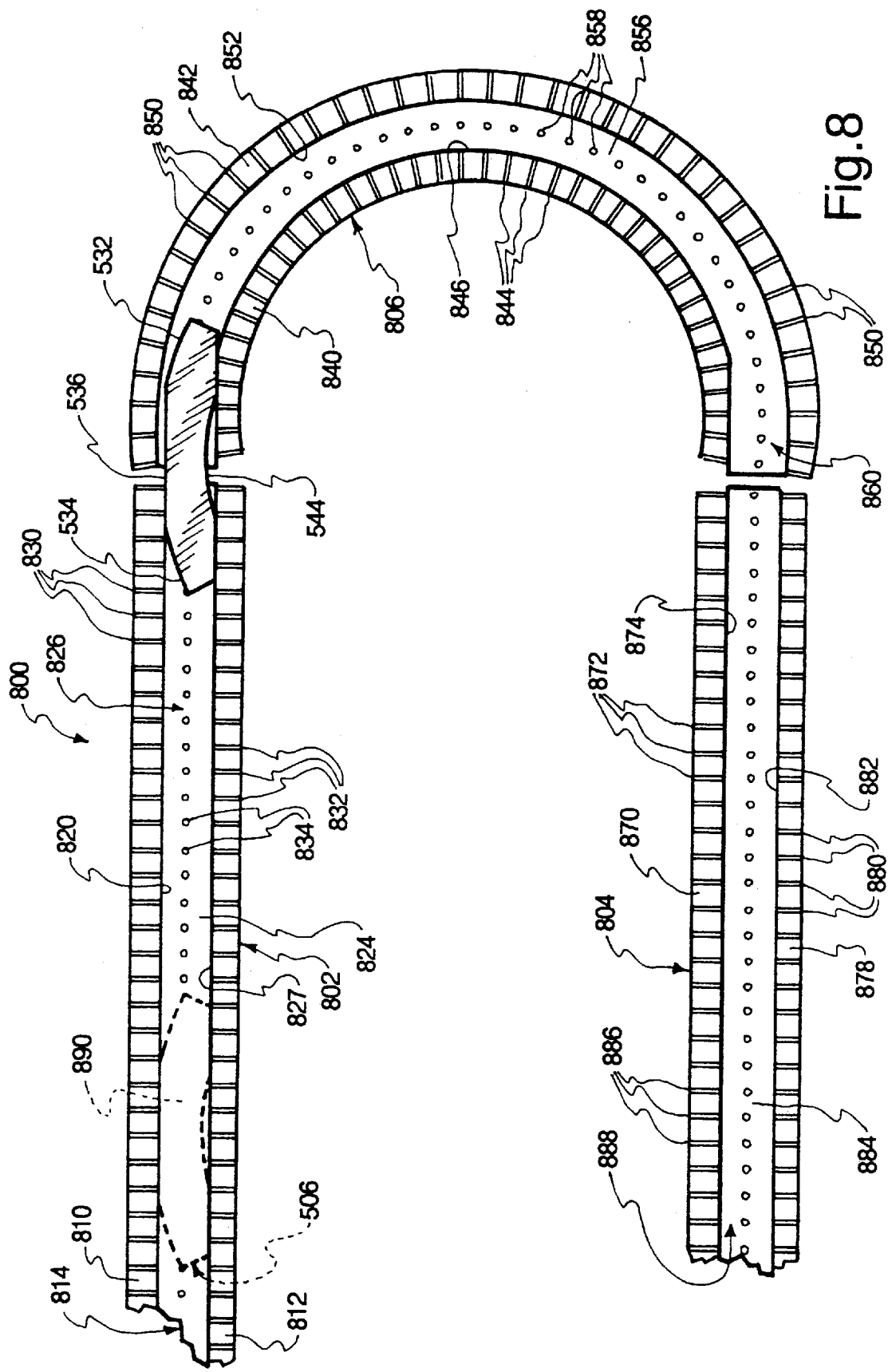
FIG. 8 is a cross-sectional view of an air bearing of the truck shown in FIG. 5 disposed within a raceway.

FIG. 8 illustrates the air bearing 506 positioned within a pressurized raceway 800. As shown, the pressurized raceway 800 includes top and bottom straight, or linear, portions 802 and 804. Side curved, or semicircular, portions 806 interconnect the linear portions 802 and 804. The top linear portion 802 is illustrated as having a top wall 810, a bottom wall 812, and a rear wall 814. Top, bottom and rear inner surfaces 820, 822, and 824 define a top linear portion interior 826, through which the air bearing 506 travels. Pressurized air is delivered into the interior 826 through air apertures 830 formed through the top wall 810, through air apertures 832 formed through the bottom wall 812, and through air apertures 834 formed through the rear wall 814.

In operation, pressurized air is delivered through the air apertures 830, 832, and 834 into the linear portion interior 826 using conventional air supply devices, such as an air compressor, a blower, an air pump, or the like. The air bearings 506, are thus configured to ride on the pressurized air as they travel through the linear portion interior 826.

As shown, when the air bearing 506 is positioned within the linear portion interior 826, the top flat surface 536 conforms to the top surface 820 of the linear portion interior 826 while the bottom front and rear flat surfaces 540 and 542 conform to the bottom surface 822. Additionally, the transverse flat end surface 530 conforms to the flat rear inner surface 824. The pressurized air provides support to the top flat surface 536, the bottom front and rear flat surfaces 540 and 542, and the transverse flat end surface 530 so that the air bearing 506 may travel smoothly through the raceway 800 riding on the pressurized air.

Figure 9:
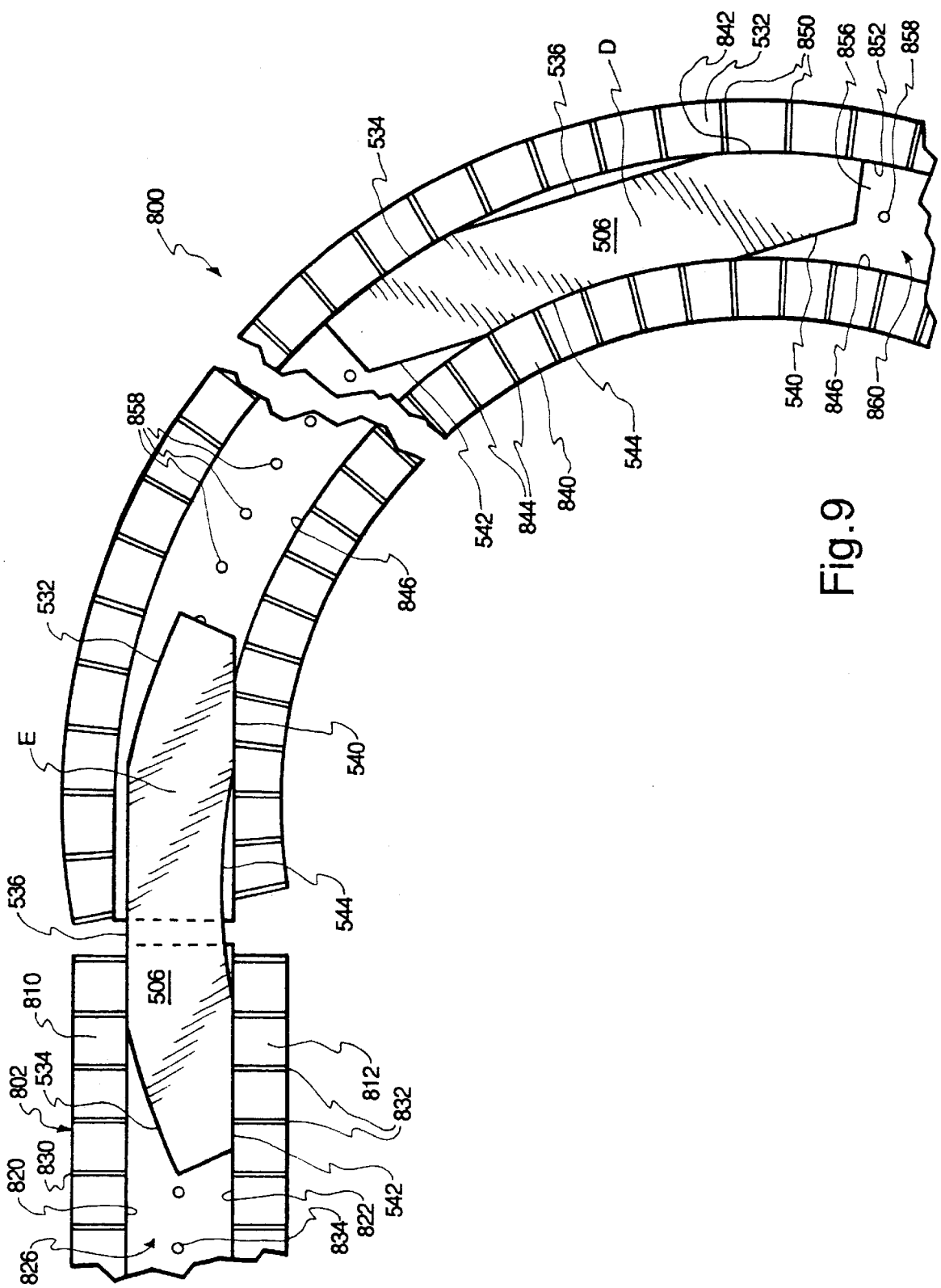
FIG. 9 is an enlarged cross-sectional view of the raceway of FIG. 8.

FIG. 8 also illustrates that the raceway 800 includes a curved, or semicircular, portion 806, which includes inner and outer walls 840 and 842. The inner wall 840 has air apertures 844 formed therein and includes an inside surface 846. Similarly, the outer wall 842 has air apertures 850 formed therein and includes an inside surface 852. In addition, a curved portion rear wall surface 856 has air apertures 858 disposed therein. The inside surfaces 846 and 852, and rear wall surface 856 define a curved portion interior region 860 through which the air bearing 506 may pass. As illustrated in FIG. 9, when the air bearing 506 is positioned within the interior region 860, the front curved surface 532 and the rear curved surface 534 of the air bearing 506 conform to the curvature of the inside surface 852. Likewise, the bottom curved surface 544 conforms to the inside surface 846 when the air bearing 506 is positioned within the interior region 860. An opposing curved portion of the raceway (not shown) configured identically to the curved portion 806 is also positioned opposite the curved portion 806 and interconnects the top and bottom portions 802 and 804 in the same manner as the curved portion 806.

The bottom linear portion 804 includes a top wall 870 having air apertures 872 and an inside surface 874 and a bottom wall 878 having air apertures 880 and an inside surface 882. A bottom portion rear inside surface 884 having apertures 886, together with the inside surfaces 874 and 882 define a bottom portion interior 888 through which the air bearing 506 travels supported by pressurized air delivered through the apertures 872, 880, and 886. Because the bottom linear portion inside surfaces 874 and 882 are substantially linear, when the air bearing 506 is positioned within the linear portion interior 826, the flat surface 536 conforms to the top surface 874 while the bottom front and rear flat surfaces 540 and 542 conform to the bottom surface 882. Additionally, the transverse flat end surface 530 (FIG. 5) conforms to the flat rear inner surface 884. The pressurized air provides support to the top flat surface 536, the bottom front and rear flat surfaces 540 and 542, and the transverse flat end surface 530 through the apertures 872, 880, and 886 so that the air bearing 506 may travel smoothly through the raceway 800.

FIG. 9 illustrates air bearings 506 in different positions D and E within the raceway 800. One air bearing 506 is positioned in position D within the curved interior 860 and the other air bearing 506 is positioned in position E between the interiors 860 and 826. As shown, when the air bearing 506 is positioned in the position D, the air bearing curved bottom surface 544 conforms with the curved surface 846 so that the air bearing 506 can be at least partially supported by pressurized air delivered through the apertures 844. Additionally, when in the position D, the top curved surfaces 532 and 534 of the air bearing 506 may be at least partially supported by pressurized air delivered through the apertures 858. While not shown, the transverse flat edge 530 of the air bearing 506 conforms to the flat surface 856 so that the pressurized air delivered through the apertures 858 disposed therein provides lateral support to the air bearings 506. Hence, in operation, the curved surfaces 544, 534, and 532 do not contact the curved surfaces 846 and 852, but rather ride on the pressurized air delivered through the surface apertures. The flat surfaces 536, 540, and 542 of the air bearing 506 do not provide significant support to the air bearing when the air bearing is in the position 900 since they are spaced much farther away from the surfaces through which the pressurized air is delivered.

In contrast, when the air bearing 506 is in the position 902 shown in FIG. 9 or in the position 890 shown in FIG. 8, the air bearing 506 is at least partially supported by one or more of the flat surfaces 536, 540, and 542. For example, when the air bearing 506 is in the position 890 shown in FIG. 8, the flat surfaces 540 and 542 conform to the bottom surface 822 are supported by pressurized air delivered through the apertures 823. Similarly, the top flat surface 536 conforms to the top surface 820 and is maintained separated from the top surface 820 by the pressurized air delivered through the apertures 830. In addition, the transverse end surface 530 (FIG. 5) is maintained separated from the surface 824 by the pressurized air delivered through the apertures 824.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A shutter assembly for a motion picture projector, the projector having a conveyor for moving the shutter assembly along a continuous path, the shutter assembly comprising:
   a plurality of truck bodies rigidly mounted to a conveyor and being oriented substantially transversely with respect to a direction of travel, each truck body comprising a pair of bearings positioned to advance along an associated raceway;
   a shutter mounting bracket secured about the truck bodies, the shutter mounting bracket including:
      an aperture through which a first truck bearing may extend, the aperture being sized so that the first truck is statically disposed within the shutter mounting bracket;
      an elongated slot through which a second truck bearing may extend, the second truck bearing being slidably disposed within the elongated slot to permit the second truck to move relative to the shutter mounting bracket to permit a linear distance between the first and second trucks to vary as the trucks move between straight and curved portions of a truck path; and
   a shutter mounted on the shutter mounting bracket, the shutter being configured to periodically block a light path of the projector when the shutter is moved across a projector aperture block.

2. The motion picture projector shutter assembly according to claim 1 wherein the bearings further comprise rollers.

3. The motion picture projector shutter assembly according to claim 1 wherein the bearings further comprise air bearings.

4. The motion picture projector shutter assembly according to claim 1, wherein each truck body further includes at least one bushing disposed between the bearing and the truck body, the bushing being disposed within the aperture or the elongated slot.

5. The motion picture projector shutter assembly according to claim 1 wherein the conveyor is clamped to each of the truck bodies.

6. An apparatus for mounting a truck body to a toothed conveyor of a motion film projector, comprising:
   a conveyor having a top surface and a bottom surface;
   a plurality of conveyor teeth formed on the conveyor bottom surface;
   a truck body having a groove, one of the conveyor teeth being positioned in the groove;
   a plurality of bearings coupled to the truck body for guiding the truck body along a raceway;
   a clamp positioned adjacent to the conveyor top surface opposite the truck body, the clamp being connected to the truck body to clamp the conveyor tooth within the groove and to secure the truck body to the conveyor.

7. The apparatus for mounting a truck body to a toothed conveyor according to claim 6, wherein the bearings include rollers.

8. The apparatus for mounting a truck body to a toothed conveyor according to claim 6, wherein the truck body includes a channel into which the conveyor is positioned so that the conveyor top surface is substantially flush with a top surface of the truck body.

9. The apparatus for mounting a truck body to a toothed conveyor according to claim 6, wherein the clamp and the truck body are secured to each other by at least one fastener disposed on either side of the conveyor.

10. The apparatus for mounting a truck body to a toothed conveyor according to claim 6, wherein the groove has a width approximately equal to a width of one of the conveyor teeth so that one of the conveyor teeth may be tightly disposed within the groove.

11. The apparatus for mounting a truck body to a toothed conveyor according to claim 6, wherein the clamp includes a flat plate.

12. The apparatus for mounting a truck body to a toothed conveyor according to claim 6, wherein the bearings include air bearings.

13. A motion picture film projector, comprising:
   a housing having a aperture block, the aperture block having an optical axis;
   a conveyor having a linear direction of travel oriented substantially orthogonal to the optical axis;
   a pressurized air raceway coupled to the housing, the pressurized raceway defining interior regions into which pressurized air is delivered;
   a truck rigidly mounted on the conveyor;
   a shutter mounting bracket coupled to the truck, the shutter mounting bracket having a shutter mounted thereon, the shutter being configured to periodically block a light path of the projector when the shutter is moved across the aperture block; and an air bearing coupled to the truck and substantially disposed within the pressurized air raceway interior region for guiding the truck along the pressurized air raceway.

14. The motion picture film projector according to claim 13, wherein the pressurized air raceway further comprises straight and curved portions, the air bearing further comprising a top surface having straight and curved portions to accommodate for the straight and curved portions of the pressurized air raceway.

15. The motion picture film projector according to claim 13 wherein the pressurized air raceway further comprises straight and curved portions, the air bearing further comprising a top surface having straight and curved portions and a bottom surface having straight and curved portions to accommodate for the straight and curved portions of the pressurized air raceway.

16. The motion picture film projector according to claim 13, further comprising first and second trucks mounted to the conveyor, the shutter mounting bracket further including:

an aperture through which the first truck bearing may extend, the aperture being sized so that the first truck is statically disposed within the shutter mounting bracket;

an elongated slot through which the second truck bearing may extend, the second truck bearing being slidably disposed within the elongated slot to permit the second truck to move relative to the shutter mounting bracket.

17. The motion picture film projector according to claim 13, wherein the truck comprises a pair of air bearings.

18. The motion picture film projector according to claim 13, wherein the conveyor further comprises a toothed conveyor having a set of teeth formed thereon and the truck includes a groove adapted to receive one of the conveyor teeth therein.

19. The motion picture film projector according to claim 13, wherein the truck is clamped to the conveyor.

20. A method of securing a truck body to a toothed conveyor of a motion film projector, comprising:

providing a toothed conveyor having a plurality of teeth disposed thereon;

providing a truck body having a plurality of bearings coupled to the truck body for guiding the truck body along a raceway, and a groove formed therein;

disposing one of the teeth in the groove; and clamping together the truck body and the conveyor.

21. The method of securing a truck body to a toothed conveyor according to claim 20, further comprising:

providing a clamp;

fastening the clamp to the truck body to clamp the truck.

* * * * *